United States Patent
Krishnaswamy et al.

(10) Patent No.: US 9,501,684 B1
(45) Date of Patent: Nov. 22, 2016

(54) PROVIDING NON-DESTRUCTIVE EDITING RECONCILIATION

(71) Applicant: Google Inc., Mountain View, CA (US)

(72) Inventors: Aravind Krishnaswamy, San Jose, CA (US); Matthew Steiner, Los Altos, CA (US)

(73) Assignee: Google Inc., Mountain View, CA (US)

( * ) Notice: Subject to any disclaimer, the term of this patent is extended or adjusted under 35 U.S.C. 154(b) by 150 days.

(21) Appl. No.: 14/106,337

(22) Filed: Dec. 13, 2013

(51) Int. Cl.
*G06K 9/00* (2006.01)
*G06K 9/03* (2006.01)

(52) U.S. Cl.
CPC .. *G06K 9/00* (2013.01); *G06K 9/03* (2013.01)

(58) Field of Classification Search
None
See application file for complete search history.

(56) References Cited

U.S. PATENT DOCUMENTS

| | | | |
|---|---|---|---|
| 8,213,723 B2 | 7/2012 | Sawant et al. | |
| 8,270,724 B2 | 9/2012 | Iwamoto et al. | |
| 2002/0126872 A1* | 9/2002 | Brunk | G06K 9/00744 382/100 |
| 2005/0158031 A1* | 7/2005 | David | G11B 27/034 386/242 |
| 2007/0253592 A1* | 11/2007 | Sun | G06T 1/0028 382/100 |
| 2011/0194732 A1* | 8/2011 | Tsuji | G06K 9/00288 382/103 |
| 2011/0243458 A1* | 10/2011 | Yoshioka | G06T 1/0021 382/209 |
| 2012/0143856 A1* | 6/2012 | Klinkigt | G06K 9/4671 707/723 |
| 2013/0108179 A1 | 5/2013 | Marchesotti et al. | |
| 2013/0290222 A1* | 10/2013 | Gordo | G06F 17/30247 706/12 |
| 2014/0050419 A1* | 2/2014 | Lerios | G06T 11/60 382/276 |
| 2014/0056540 A1* | 2/2014 | Hamburg | G06F 21/6218 382/299 |

FOREIGN PATENT DOCUMENTS

GB 2483250 A 3/2012

* cited by examiner

*Primary Examiner* — Vikkram Bali
*Assistant Examiner* — Tracy Mangialaschi
(74) *Attorney, Agent, or Firm* — IP Spring (57) ABSTRACT

Implementations generally relate to image editing. In some implementations, a method includes receiving an edited image, where the edited image includes an edit list and an image signature. The method further includes retrieving an original image based on the image signature. The method further includes applying the edit list to the original image to obtain a modified original image. The method further includes providing the modified original image to a user if the comparing of the edited image to the modified original image meets a similarity threshold.

20 Claims, 4 Drawing Sheets

PROVIDING NON-DESTRUCTIVE EDITING RECONCILIATION

BACKGROUND

The popularity and convenience of digital cameras as well as the widespread use of Internet communications have caused user-produced images such as photographs to become ubiquitous. Image editing systems for various consumer electronic devices and personal computers enable a user to manipulate images. Non-destructive editing is useful as the edits are not permanent and can be revisited later on. Non-destructive editing is usually achieved by preserving the original image along with a list of edits to be performed on the image.

SUMMARY

Implementations generally relate to image editing. In some implementations, a method includes receiving an edited image, where the edited image includes an edit list and an image signature. The method further includes retrieving an original image based on the image signature. The method further includes applying the edit list to the original image to obtain a modified original image. The method further includes providing the modified original image to a user if the comparing of the edited image to the modified original image meets a similarity threshold.

With further regard to the method, in some implementations, the image signature is based on a checksum. In some implementations, the image signature is based on a plurality of image features. In some implementations, the retrieving includes identifying a stored image that corresponds to the image signature. In some implementations, the similarity threshold is based on one or more image features. In some implementations, the method further includes providing the edited image to the user if the comparing of the edited image to the modified original image does not meet the similarity threshold. In some implementations, the providing of the modified original image includes generating a virtual copy of the original image, and referencing the original image and the edit list instead of the edited image. In some implementations, the method further includes comparing the edited image to the modified original image.

In some implementations, a method includes receiving an edited image, where the edited image includes an edit list and an image signature. The method further includes retrieving an original image based on the image signature, where the retrieving includes identifying a stored image that corresponds to the image signature. The method further includes applying the edit list to the original image to obtain a modified original image. The method further includes comparing the edited image to the modified original image. The method further includes providing the modified original image to a user if the comparing of the edited image to the modified original image meets a similarity threshold, where the similarity threshold is based on one or more image features.

With further regard to the method, in some implementations, the image signature is based on a checksum. In some implementations, the image signature is based on a plurality of image features. In some implementations, the method further includes providing the edited image to the user if the comparing of the edited image to the modified original image does not meet the similarity threshold. In some implementations, the providing of the modified original image includes generating a virtual copy of the original image, and referencing the original image and the edit list instead of the edited image.

In some implementations, a system includes one or more processors, and logic encoded in one or more tangible media for execution by the one or more processors. When executed, the logic is operable to perform operations including: receiving an edited image, where the edited image includes an edit list and an image signature; retrieving an original image based on the image signature; applying the edit list to the original image to obtain a modified original image; and providing the modified original image to a user if the comparing of the edited image to the modified original image meets a similarity threshold.

With further regard to the system, in some implementations, the image signature is based on a checksum. In some implementations, the image signature is based on a plurality of image features. In some implementations, the retrieving includes identifying a stored image that corresponds to the image signature. In some implementations, the similarity threshold is based on one or more image features. In some implementations, where the logic when executed is further operable to perform operations including providing the edited image to the user if the comparing of the edited image to the modified original image does not meet the similarity threshold. In some implementations, to provide the modified original image, the logic when executed is further operable to perform operations including generating a virtual copy of the original image, and referencing the original image and the edit list instead of the edited image.

DETAILED DESCRIPTION

Implementations described herein provide editing reconciliation associated with image edits. In various implementations, a system receives an edited image, where the edited image includes an image signature and an edit list. The system uses the image signature to search for, locate, and retrieve a copy of the original image. In some implementations, the signature is based on a checksum. In some implementations, the image signature is based on image features (e.g., image characteristics, etc.). In some implementations, to retrieve the original image, the system identifies a stored image that corresponds to the image signature.

The system then applies the edit list to the original image to obtain a modified original image. The system then compares the edited image to the modified original image. In some implementations, the system provides the modified original image to a user instead of the received edited image if the comparing of the edited image to the modified original image meets a similarity threshold (e.g., substantially match). As described in more detail below, by providing the modified original image, the system enables the user to further edit the image non-destructively.

Figure 1:
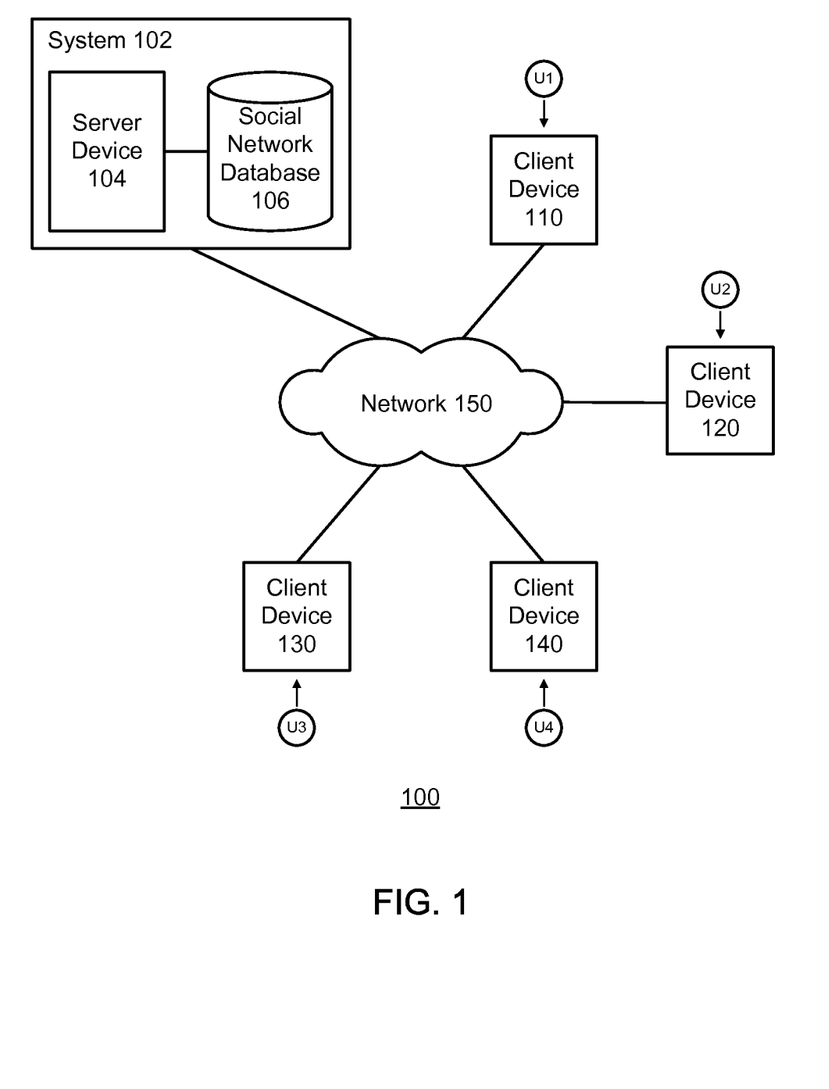
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other to share photos and other media items. Users U1, U2, U3, and U4 may also interact with system 102 to edit images and share images.

In the various implementations described herein, processor of system 102 causes the elements described herein (e.g., edit reconciliation, etc.) to be displayed in a user interface on one or more display screens.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc.

Figure 2:
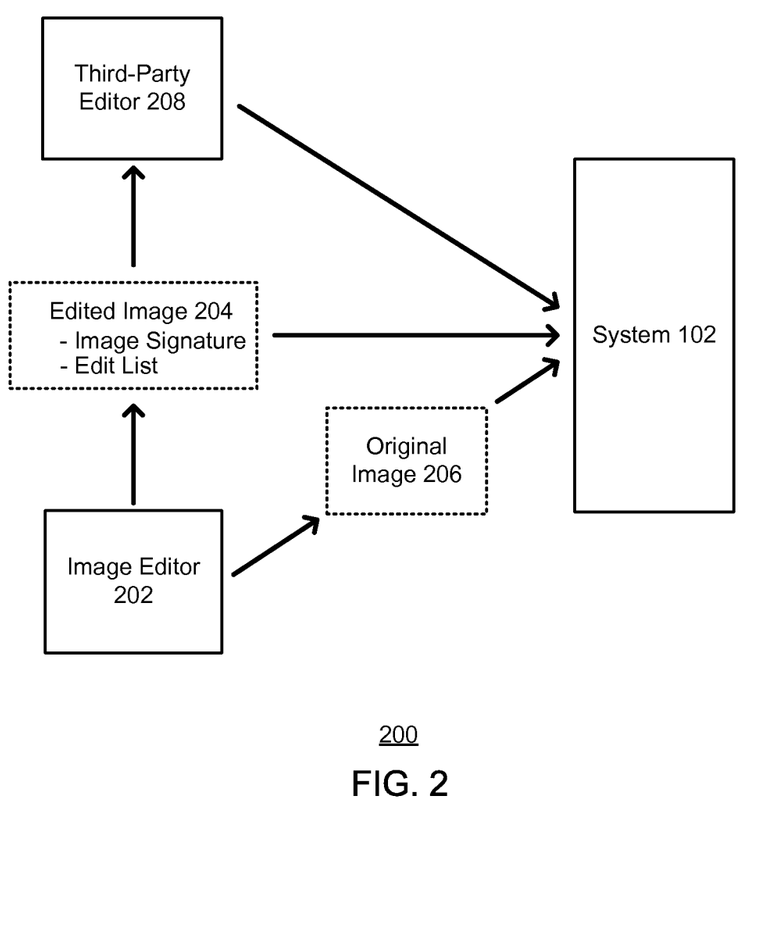
FIG. 2 illustrates an example data flow, according to some implementations.

FIG. 2 illustrates an example data flow, according to some implementations. As shown, a given image can be edited at an image editor 202 that is associated with system 102. In various implementations, system 102 provides a photo service that interacts with various editors such as image editor 202. For ease of illustration, image editor 202 is shown separately from system 102.

In various implementations, image editor 202 may be an application that resides on a user device such as a smartphone, computer tablet, desktop computer, etc., where a user can edit images directly on the user device. In some implementations, image editor 202 be a web-based application that resides on system 102. With a web-based application, system 102 enables the user to access and edit images via the cloud or any suitable network using a client at the user device.

In various implementations, an original image 206 is edited non-destructively at image editor 202 such that the edits are not permanent and such that the edits can be revisited later on. In various implementations, non-destructive editing is achieved by preserving and storing original image 206 along with a list of edits to be performed on the image. As shown, original image 206 is uploaded to system 102. Original image 206 may be stored in a storage location (e.g., a database) residing in system 102 or in any suitable storage location accessible to system 102.

With non-destructive editing, the user can later change the edits, undo edits, change the parameters of the edits, etc. For example, the user could remove a particular edit that changes the original image from color to black-and-white. In other words, with non-destructive editing, an image that is saved in a black-and-white format can revert back to the original colored image. In another example, the user could remove some edits (e.g., changes in contrast, etc.) but keep other edits (e.g., red-eye filtering, etc.) applied to the original image.

In various implementations, when a user applies a set of edits to an image, system 102 saves the edited image 204 in the local camera roll (not shown). The local camera roll contains images stored locally on the user device. In some implementations, edited image 204 is a copy of original image 206, where at least some of the actual pixels are edited or baked. As such, edited image 204 may also be referred to as a baked image.

In various implementations, system 102 embeds, in the metadata of edited image 204, an image signature of original image 206 upon which a set of edits was performed. Such edits may be referred to as a list of edits, or edit list.

In various implementations, system 102 automatically backs up original image 206 and edited image 204 (e.g., using an auto backup process). While original image 206 is backed up automatically, edited image 204 may be backed up when the user shares the edited image 204 with other users via system 102 (e.g., a social network of system 102).

In some implementations, after original image 206 is backed up/uploaded to system 102, system 102 may remove the copy of original image 206 in the camera roll on the user device in order to optimize memory space on the user device.

In various implementations, the user can save edited image 204 locally to the user's device to be available to other applications, including third-party applications. The following describes implementations where edited image 204 is processed by a third-party editor or service 208.

Referring still to FIG. 2, as shown, in various scenarios, the user can share/upload edited image 204 to third party editor 208 and can perform further edits on edited image 204. In some implementations, a duplicate copy of original image 206 may be made in order to enable non-destructive editing on different editing platforms. However, duplicate copies of original images increase (e.g., double) storage requirements. In some implementations, system 102 may delete the copy of original image 206 from the user device after system 102 backs up original image 206 at system 102, or another suitable storage location.

As indicated above, edited image 204 is embedded with metadata that includes an image signature of original image 206 and an edit list that were applied to edited/baked pixels. In various implementations, system 102 generates an image signature of each original image. In particular, system 102 may generate an image signature of each original image when a user edits each image. As described in more detail below, system 102 uses the image signature to later retrieve the original image and to reconcile that the retrieved original image is the source of a given edited image (e.g., edited image 204).

Figure 3:
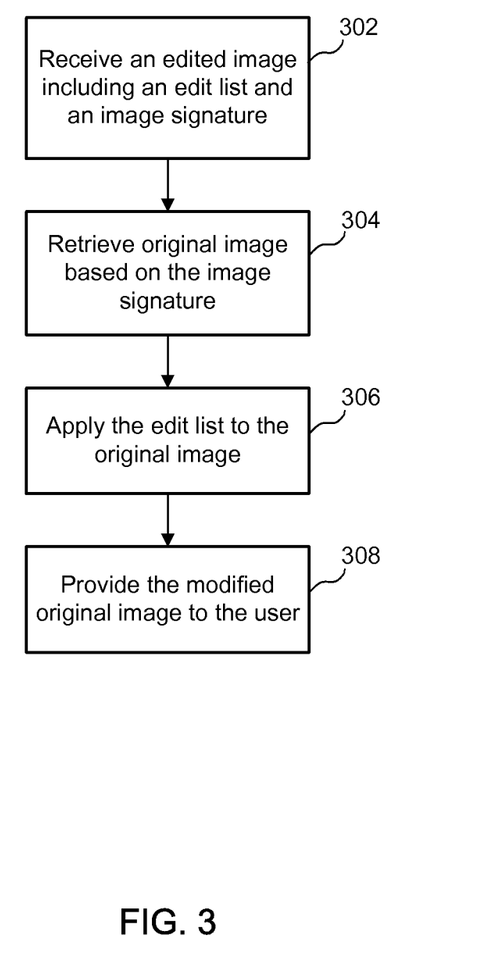
FIG. 3 illustrates an example simplified flow diagram for providing edit reconciliation, according to some implementations.

FIG. 3 illustrates an example simplified flow diagram for providing edit reconciliation, according to some implementations. Referring to both FIGS. 1, 2, and 3, a method is initiated in block 302, where system 102 receives an edited image, where the edited image includes an edit list and an image signature. In some implementations, system 102 receives a given edited image when the edited image is re-opened in a supported non-destructive editing application. As indicated above, the non-destructive editing application may be associated with system 102 (e.g., image editor 202 of FIG. 2) or may be a third-party application or service (e.g., third-party editor 208 of FIG. 2).

After system 102 receives the edited image, system 102 may then examine the metadata of the edited image in order to determine the image signature of the original image and to determine the edit list applied to the original image. In some implementations, finding such information (e.g., image signature and edits) may indicate that the edited image has been previously processed by system 102 (e.g., via image editor 202). It may indicate that the original image has been backed up or stored at a storage location (e.g., a database) associated with and accessible to system 102.

In block 304, system 102 retrieves the original image based on the image signature. In various implementations, system 102 retrieves the original image as a part of a reconciliation process, where system 102 reconciles that the edited image is derived from the original image that system 102 has previously stored. In some implementations, system 102 may initiate the reconciliation process whenever the user reopens the edited image in an image editor (e.g., image editor 202). In some implementations, system 102 may initiate the reconciliation process whenever it receives the edited image (e.g., upon upload/backup of the edited image, etc.).

In some implementations, to retrieve the original image, system 102 searches stored images and compares the image signature from the metadata of the edited image to each stored image (or to the image signature of each stored image). Such stored images may be stored in any storage location accessible to system 102. System 102 then identifies the stored image that corresponds to the image signature from the metadata of the edited image.

In some implementations, the image signature of a given image may be based on a checksum. In some implementations, the image signature may be an SHA-1 hash or any other suitable hash or checksum. For example, the image signature associated with the edited image may be a checksum that is compared to the image signature or a checksum associated a given candidate original image (e.g., a possible match). In some implementations, if the checksums match, the stored original image is retrieved from storage.

There may be instances, however, where the original image used to create the edited image is the same image as the stored original image, but the checksums may still differ. Such a scenario may occur if the user does not have full resolution uploads enabled (e.g., in an auto backup process). In some implementations, images may be backed up in different resolutions, or resized (e.g., to 2048 resolution), or compressed, etc. The following implementations enable system 102 to reconcile images regardless of such changes in resolution, size or scale, etc.

In various implementations, the image signature may be a signature or fingerprint that is based on image features. For example, an image signature may contain information about the characteristic of the original image. In some implementations, system 102 may generate the image signature based on scale-invariant features, which may be implemented using different metric tokens. For example, in various implementations, system 102 may generate different tokens for a given original image, where each token represents a different characteristic of the image. For example, a token may be based on statistics of a histogram distribution. Another token may be based on statistics of a color distribution. Another token may be based on statistics of a texture distribution, etc.

A given image signature may be based on any combination of these and other tokens in order to provide a scale-invariant way of matching two images. By incorporating scale-invariant features into the image signature, system 102 ensures robust edit reconciliation even if the original image is resized prior to upload.

In block 306, system 102 applies the edit list to the original image to obtain a modified original image. In some implementations, to further ensure that a given original image matches the image signature from the metadata of the edited image, system 102 may compare the modified original image to the edited image. In various implementations, the modified original image is edited non-destructively, while the edited image might or might not have been edited non-destructively.

In some implementations, system 102 determines the perceptual difference between the modified original image and the edited image. If the perceptual difference between the two edited images is small (to a predetermined degree), it indicates that the edited image was derived from the original image found. In other words, if the edited image is truly derived from the found original image, the modified original image and the edited image should substantially match.

In some implementations, if the perceptual difference between the two edited images is large (to a predetermined degree), it may indicate that the user has done further edits to a previously edited image. Such a scenario may occur, for example, where the user exports an edited image to third-party editor 208 and then makes additional edits to that already edited image. In some scenarios, edited image 204 can be edited non-destructively at third-party editor 208, where edited image 204 is preserved and stored. Third-party editor 208 might preserve (e.g., not overwrite) the metadata (e.g., image signature and edit list) that is already there. In other scenarios, edited image 204 can be edited destructively at third-party editor 208. Destructive editing is potentially problematic, because the version of edited image 204 as further edited at image editor 202 is now lost, as it has been replaced by a newly edited version.

In some implementations, system 102 may store the newly edited image (along with a new image signature and new edit list) as a different edited version, where the new image signature corresponds to the previously edited image). As such, system 102 should not categorize the original image as a virtual copy. System 102 may consider the previously edited image as a brand new image (e.g., as an original image).

In block 308, system 102 provides the modified original image to the user if the comparing of the edited image 204 to the modified original image meets a similarity threshold. If the comparing of the edited image 204 to the modified original image does not meet the similarity threshold, system 102 can still provide the edited image 204 to the user.

In some implementations, the similarity threshold is based on matching checksums between the image signature stored in the metadata of the edited image 204 and the image signature of the original image. For example, the comparing of the two images may meet the similarity threshold if the checksums match.

In some implementations, the similarity threshold is based on image features (e.g., scale-invariant features). For example, the comparing may meet the similarity threshold if the image features match.

In some implementations, the similarity threshold is based on perceptual differences. For example, the comparing may meet the similarity threshold if the perceptual differences are small (to a predetermined degree).

By providing the modified original image to the user, system 102 enables the user to open an edited/baked image, and to enjoy the full benefits of a non-destructive editing system. This also enables the user to revert to previous edits and/or change any of the edits the user has made.

In some implementations, system 102 saves a newly edited image with a new edit list and with the image signature for the original image. As a result, system 102 enables users to manage different versions of their images by automatically reconciling the different versions of edits. For example, one version may be the first edited image made the first time that the user edited the original images. Another version may be a subsequent edited image. Using features such as auto backup, different versions of edited copies can be uploaded, while preserving the original image. Because the original image is preserved, a copy of an edited image (along with the corresponding original image and edit list) can be shared and edited on different platforms, including third-party editing applications and services.

In various implementations, when the edited image is uploaded again to system 102 (e.g., via an auto backup process, or via a share action by the user), system 102 examines the metadata to determine the image signature of the original image and to determine the edit list applied to the original image. In various implementations, if such an image signature is found, system 102 searches for the original image.

In some implementations, to provide the modified original image, when system 102 finds the original image, system 102 generates a virtual copy of the original image with the embedded edit list. System 102 then references the original image and the edit list instead of the edited image. System 102 may then replace the edited image with this virtual copy. This then enables the user to use online editing tools to non-destructively continue editing the baked image. In some implementations, system 102 deletes the edited image if the modified original image is provided to the user.

In some implementations, system 102 may add a second layer of image signature checks to account for users that have edited a baked image in another editing application, and where that application has left the metadata intact. During the reconciliation step, once the original image is found, system 102 may apply the edit list on the original image and then perform a difference check with the baked image.

System 102 looks for a perceptual match within some threshold to verify that original image plus the stored edit list is the baked image. This step can be processing intensive as it requires applying the edit list on the original image. System 102 may therefore store a second signature inside the baked image metadata. This signature is generated from the results of the baked image pixels, and during reconciliation, system 102 regenerates the signature from the baked image pixels and verifies that it matches the stored signature. This would be an efficient way to ensure that a third party application has not altered the baked image pixels.

In some scenarios, running an edit list on an entire image can potentially be slow. In some implementations, system 102 may sample regions of the image, where system 102 divides the image down into tiles (e.g., 64×64). In some implementations, system 102 may use a Halton sequence to select the tiles to sample. System 102 then runs the edit list on the tiles and compares it to the resulting image.

This way, system 102 controls the degree of certainty of a match by dialing up or down the percentage of total tiles that system 102 checks. The random distribution of the tiles ensures that even with a low percentage of tiles being checked (e.g., 10%, etc.), system 102 can have a relatively high degree of confidence in the results. This also speeds up the reconciliation process.

Implementations described herein provide various benefits. For example, implementations enable users to use different online editing tools and services to non-destructively continue editing a given image. A user is not limited to a single editing system used to created a given image. Once an image leaves a given editing system (e.g., is exported), it is possible to easily reconcile the image back into the system. Implementations also enable users to manage different versions of their images by automatically reconciling the different versions. Implementations eliminate the need for users to manually reconcile their edited images with original images.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described herein.

As indicated above, implementations enable a user, via system 102, to modify frames of different types of streams (e.g., video streams, audio streams, etc.) and streams being transmitted in different directions (e.g., outbound streams and/or inbound streams).

Figure 4:
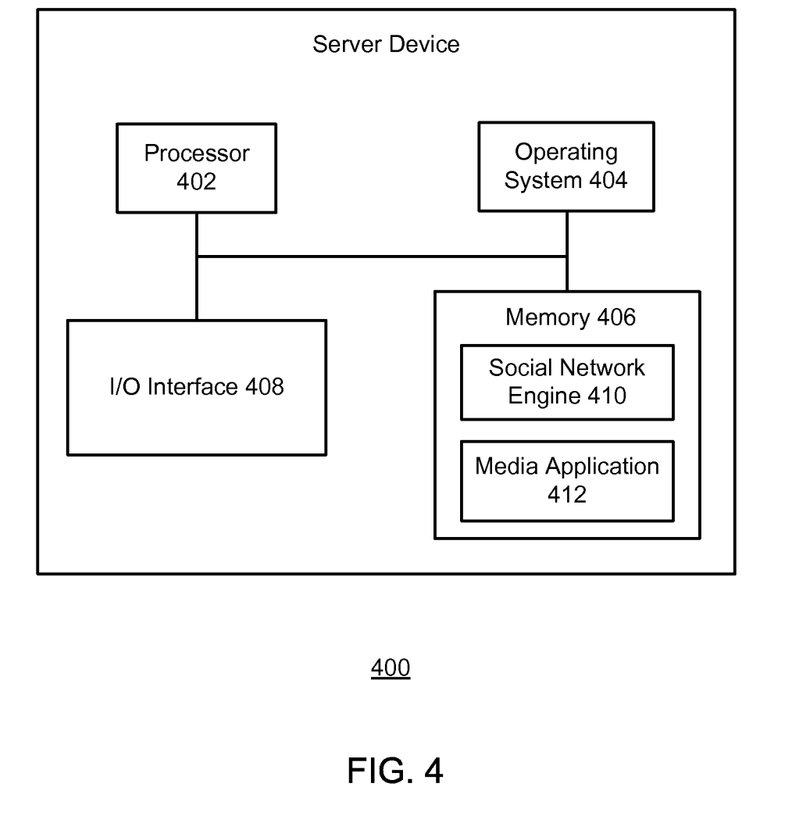
FIG. 4 illustrates a block diagram of an example server device, which may be used to implement the implementations described herein.

FIG. 4 illustrates a block diagram of an example server device 400, which may be used to implement the implementations described herein. For example, server device 400 may be used to implement server device 104 of FIG. 1, as well as to perform the method implementations described herein. In some implementations, server device 400 includes a processor 402, an operating system 404, a memory 406, and an input/output (I/O) interface 408. Server device 400 also includes a social network engine 410 and a media application 412, which may be stored in memory 406 or on any other suitable storage location or computer-readable medium. Media application 412 provides instructions that enable processor 402 to perform the functions described herein and other functions.

For ease of illustration, FIG. 4 shows one block for each of processor 402, operating system 404, memory 406, I/O interface 408, social network engine 410, and media application 412. These blocks 402, 404, 406, 408, 410, and 412 may represent multiple processors, operating systems, memories, I/O interfaces, social network engines, and media applications. In other implementations, server device 400 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:

1. A method comprising:
    receiving an edited image associated with a first user, wherein the edited image includes an edit list and an image signature;
    retrieving an original image by identifying a stored image that corresponds to the image signature, wherein the retrieving comprises identifying a stored image that corresponds to the image signature;
    applying the edit list to the original image to obtain a modified original image;
    comparing, by one or more processors, the edited image to the modified original image to determine a similarity value based on one or more image features;
    responsive to the similarity value meeting a similarity threshold, providing the modified original image to a second user in a social network, wherein providing the modified original image to the second user enables the second user to make non-destructive edits to the modified original image; and
    responsive to the similarity value not meeting the similarity threshold, providing the edited image to the second user in the social network, wherein providing the edited image to the second user prevents the second user from making non-destructive edits.

2. The method of claim 1, wherein the image signature is based on a checksum.

3. The method of claim 1, wherein the edited image further includes a second image signature, wherein the second image signature is based on pixels of the edited image, the method further comprising, prior to retrieving the original image:
    generating a third signature based on pixels of the edited image; and
    determining that the third signature matches the second image signature.

4. The method of claim 1, wherein the nondestructive edits include removing a particular edit made to the modified original image.

5. The method of claim 1, wherein the providing of the modified original image comprises:
    generating a virtual copy of the original image; and
    referencing the original image and the edit list instead of the edited image.

6. A method comprising:
    receiving an edited image from a user device, wherein the edited image includes an edit list and an image signature, and wherein the image signature is based on one or more scale-invariant image features;
    retrieving an original image from storage on the user device based on the image signature;
    applying the edit list to the original image to obtain a modified original image;
    comparing, by one or more processors, the edited image to the modified original image to determine a similarity value based on one or more image features;
    responsive to the similarity value meeting a similarity threshold, providing the modified original image to a user;
    responsive to the similarity value not meeting the similarity threshold, providing the edited image to the user;
    backing up the original image to cloud storage; and
    deleting the original image from a camera roll on the user device.

7. The method of claim 6, wherein the image signature is based on a checksum and the checksum is based on the original image.

8. The method of claim 6, wherein a first number of pixels in the edited image is different from a second number of pixels in the original image.

9. The method of claim 6, wherein the retrieving comprises identifying a stored image that corresponds to the image signature.

10. The method of claim 6, wherein the similarity threshold is based on the one or more scale-invariant image features.

11. The method of claim 6, wherein the scale-invariant image features are based on generating one or more tokens that each represent a different characteristic of the edited image.

12. The method of claim 6, wherein the providing of the modified original image comprises:
    generating a virtual copy of the original image; and
    referencing the original image and the edit list instead of the edited image.

13. The method of claim 6, wherein the image signature is a secure hash algorithm 1 (SHA-1) that is based on the original image.

14. A system comprising:
    one or more processors; and
    logic encoded in one or more non-transitory media for execution by the one or more processors that when executed by the one or processors causes the one or more processors to perform operations comprising:

receiving an edited image from a user device, wherein the edited image includes an edit list and an image signature and wherein the image signature is based on scale-invariant image features that include at least one of statistics of a histogram distribution, statistics of a color distribution, and statistics of a texture distribution;

retrieving an original image from storage on the user device based on the image signature;

applying the edit list to the original image to obtain a modified original image;

comparing the edited image to the modified original image to determine a similarity value based on one or more image features;

responsive to the similarity value meeting a similarity threshold, providing the modified original image to a user;

responsive to the similarity value not meeting the similarity threshold, providing the edited image to the user;

backing up the original image to cloud storage; and deleting the original image from a camera roll on the user device.

15. The system of claim 14, wherein the image signature is based on a checksum.

16. The system of claim 14, wherein the image signature is based on a plurality of image features.

17. The system of claim 14, wherein the retrieving comprises identifying a stored image that corresponds to the image signature.

18. The system of claim 14, wherein the similarity threshold is based on the one or more scale-invariant image features.

19. The system of claim 14, wherein the scale-invariant image features are based on generating one or more tokens that each represent a different characteristic of the edited image.

20. The system of claim 14, to provide the modified original image, the logic when executed by the one or more processors further causes the one or more processors to perform operations comprising:

generating a virtual copy of the original image; and referencing the original image and the edit list instead of the edited image.

* * * * *